UNITED STATES PATENT OFFICE.

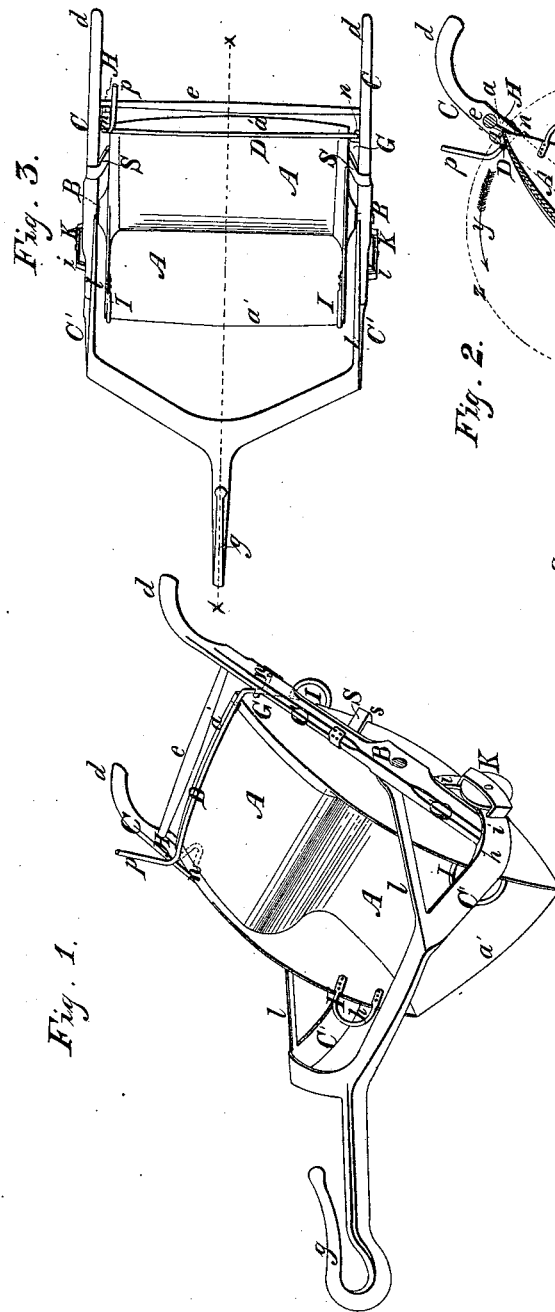

ASHLEY CRAFTS AND EBENEZER WEEKS, OF AUBURN, OHIO.

DOUBLE REVOLVING SCRAPER.

Specification of Letters Patent No. 6,918, dated December 4, 1849.

*To all whom it may concern:*

Be it known that we, ASHLEY CRAFTS and EBENEZER WEEKS, of Auburn, in the county of Geauga and State of Ohio, have invented a new and useful Improvement in Scoops or Scrapers for Excavating Earth, called the "Double Revolving Self-Discharging Earth Scoop or Scraper;" and we do hereby declare that the following is a full and exact description thereof, reference being had to the annexed drawings of the same, making part of this specification.

In the scrapers in common use much time is lost and extra labor incurred in discharging them, it being necessary to interrupt the motion after they have been discharged in order to right them for refilling; whereas by our double revolving scraper these disadvantages are completely obviated, since it can be discharged at pleasure without the least stoppage in the motion and in the act of discharging it is brought into a position to collect a new load without the necessity of being righted. The great benefits, therefore, which must result from their use over the common scrapers must be obvious to all who have a practical knowledge of the disadvantages adverted to. They might be well illustrated by reference to that useful invention the "revolving horse hay rake," which operates on a similar principle for another purpose, the advantages of which over the common rakes have been thoroughly tested. Having premised thus much we shall now proceed to describe our improved scraper.

Figure 1, is a perspective view, and Fig. 2 a sectional view of the scoop on the line $x$, $x$, of Fig. 3, and Fig. 3, a top view.

Similar letters of reference on the several figures refer to corresponding parts.

A, is the double scoop made of iron, or of any suitable metal, the bottoms of the cavities thereof being united or cast so as to form a curve line of contrary flexure or cima reversa form as indicated by the dotted line ($a$, $a$, $a$,) Fig. 2. The whole scoop may be cast solid, or otherwise, with a strong pivot B in the center of each side, on which it bears and revolves in the frame; the front edges $a'$, $a'$, of the bottoms being thin so as to cut the earth, as in ordinary scoops or scrapers; but they gradually increase in thickness toward the pivots or center line, as shown in Fig. 2.

C C, &c., is a strong wrought iron frame which receives the pivots of the scoop at B, B; the rear ends terminating in two handles $d$, $d$. Similar to those of a plough, and are connected together by a transverse bar, ($e$) while the front portions at C', C', are turned up and then bent laterally (nearly at a right angle) above the lip of the scoop and terminate in a hook or "goose neck" ($g$) at its center for attaching the beast of draft, or moving power. At the angles ($h$) of the frame, which are situated about midway between the pivots and lip of the scoop, so that it will nearly balance on those points when filled with earth, a small iron arch ($i$) is attached to the underside in which bear two pulleys or wheels K, K, so placed that their peripheries descend a short distance below the sides of the scoop and when the handles $d$, $d$, are depressed bear upon the ground and become fulcra for disengaging the lip from the earth when the scoop is loaded and afterward serve to relieve the friction in dragging it to the point where the earth is to be discharged, the whole weight bearing on them during this latter operation instead of the sides and bottom of the scoop as represented in Fig. 1. For the purpose of strengthening the frame, C, it has braces ($l$, $l$,) from the points where the pivots of the scoop are inserted to the base of the transverse arch and form continuations of the line of draft to their centers. This line of draft is indicated by the dotted line 2, 2, in Fig. 2.

D is a confining rod bent in the form of a crank as shown in Figs. 1 and 2, ($n$, $n$,) being the pivots which bear inside the sides of the frame, and $p$, is a short lever to throw it in and out of gear with the scoop. When in gear as shown in Figs. 1, 2, and 3, it prevents the rear end of the scoop from rising, but when the lever $p$, is depressed by the driver and the confining rod D, thus thrown out of gear, while at the same time the handles are elevated, the lip of the scoop becomes engaged with the ground and the beast of draft continuing to move forward it revolves on the pivots in the arc of a circle as indicated by the dotted line ($z$) and arrows ($y$) and discharges its contents, bringing the other cavity of the scoop in a position to receive its load, the confining rod D having been first thrown over the scoop. The latter is likewise held up, by the edge thereof, immediately after discharging, falling into a notch on a shoulder ($s$) in the arm or spring S attached to the side of the frame. The pin G arrests the upward amovement of the holding rod in locking the scoop and the spring H its descent in unlocking the same.

Instead of fastening the beast of draft to the scraper we sometimes separate the scraper from the metallic frame and attach it to a cart where the earth is to be hauled to any considerable distance; and after being loaded the scoop is raised free from the ground by a suitable lever and attachments on the cart, in which position it may be hauled to the place of deposit and discharged, effecting in this way a saving of the labor of loading the cart with shovels.

Instead of casting the double or cima-reversa scoop and scraper with elliptical ends as represented in Fig. 2; I sometimes make them in separate pieces, bolted, or otherwise secured together, having the cima-reversa bottom made of wrought iron with steel scrapers or scooping edges; or of wood shod with iron or steel, and the frame of wood and metal combined.

The elliptical sides should be made more full at the points where the bows I are represented so that they shall have a firm bearing on the ground while depressing the handles in order to bring the supporting or sustaining hook (s) beneath the lower edges of the sides of the scoop and the confining rod D, over and against the upper portion of the scoop. The bows or hoops I are designed to form said bearings when the sides of the scoop are not made, sufficiently full, and are secured by rivets or screw bolts, so that they can be easily removed at pleasure.

The before described mode of forming the revolving double scoop and scraper produces considerable saving of iron as the swelling at the middle for strengthening the pivots answers for the two scoops as well as for one and the whole can be cast from a match plate which can be easily formed from a pattern.

This scraper is admirably adapted for the purpose of scraping streets, alleys, and other places of continuous rows of offal and filth and dirt into separate piles for the convenience of removal by the scavenger following with his cart and shovel. And also for scraping other substances into heaps, where great expedition is required.

What we claim as our invention and desire to secure by Letters Patent, is—

The double cavity or sima-reversa scoop and scraper, whether of the precise shape herein described, or of any other substantially the same, revolving on pivots, so as to discharge and reload itself without being stopped and righted (irrespective of the particular form of frame in which it is placed) in combination with devices substantially as described for fastening and setting free the same.

In testimony whereof we have hereunto signed our names before two subscribing witnesses.

ASHLEY CRAFTS.
EBENEZER WEEKS.

Witnesses:
 WM. P. ELLIOT,
 LUND WASHINGTON.